US007474255B2

(12) United States Patent  (10) Patent No.: US 7,474,255 B2
Hsieh et al.  (45) Date of Patent: Jan. 6, 2009

(54) TARGET TRACKING METHOD OF RADAR WITH FREQUENCY MODULATED CONTINUOUS WAVE

(75) Inventors: Hung-Tao Hsieh, Jhubei (TW); Feng-Ling Liu, Longtan Township, Taoyuan County (TW); Yao-Hwa Wen, Sinjhuang (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 71 days.

(21) Appl. No.: 11/633,445

(22) Filed: Dec. 5, 2006

(65) Prior Publication Data

US 2008/0129582 A1   Jun. 5, 2008

(51) Int. Cl.
*G01S 13/66* (2006.01)
*G01S 13/32* (2006.01)
*G01S 7/35* (2006.01)
*G01S 13/00* (2006.01)

(52) U.S. Cl. .............................. 342/95; 342/73; 342/74; 342/89; 342/91; 342/93; 342/94; 342/104; 342/105; 342/109; 342/115; 342/118; 342/128; 342/147; 342/175; 342/195; 342/196

(58) Field of Classification Search .................. 342/42, 342/70, 73–81, 89–103, 118, 128–133, 147–158, 342/175, 195, 104–116, 120, 159, 196, 165–174
See application file for complete search history.

(56) References Cited

U.S. PATENT DOCUMENTS

| 3,249,935 | A | * | 5/1966 | Follen | 342/97 |
|---|---|---|---|---|---|
| 4,072,947 | A | * | 2/1978 | Johnson | 342/103 |
| 4,321,602 | A | * | 3/1982 | Kipp | 342/103 |
| 4,367,473 | A | * | 1/1983 | Marin et al. | 342/128 |
| 4,429,309 | A | * | 1/1984 | Kipp | 342/103 |
| 4,509,049 | A | * | 4/1985 | Haendel et al. | 342/128 |
| 4,599,618 | A | * | 7/1986 | Haendel et al. | 342/103 |
| 4,806,935 | A | * | 2/1989 | Fosket et al. | 342/120 |
| 5,047,778 | A | * | 9/1991 | Cofield et al. | 342/97 |
| 5,150,124 | A | * | 9/1992 | Moore et al. | 342/128 |
| 6,011,507 | A | * | 1/2000 | Curran et al. | 342/70 |
| 6,121,917 | A | * | 9/2000 | Yamada | 342/128 |

(Continued)

FOREIGN PATENT DOCUMENTS

GB     2405277 A  *  2/2005

(Continued)

*Primary Examiner*—Bernarr E Gregory
(74) *Attorney, Agent, or Firm*—Rosenberg, Klein & Lee

(57) ABSTRACT

The present invention relates to a target tracking method of radar with frequency modulated continuous wave, which transmits a transmitted signal to receive a return wave of the transmitted signal that is used for detecting the target and obtaining the relative distance between the target and the radar. The target tracking method includes transmitting a frequency modulated continuous wave and receiving the reflected wave; getting a reflected wave corresponding to the target by detecting the reflected wave; getting a range gate error by seeking the plurality of the range gates corresponding to the reflected wave; and getting a position and a speed of the target at next time by knowing the position of the target at present time basis of the range gate error. Hence, the relative distance between the radar and the target is got.

15 Claims, 4 Drawing Sheets

U.S. PATENT DOCUMENTS

| | | | |
|---|---|---|---|
| 6,888,494 B2 * | 5/2005 | Tamatsu et al. | 342/128 |
| 7,196,654 B2 * | 3/2007 | Edwards et al. | 342/128 |
| 2005/0062640 A1 * | 3/2005 | Edwards et al. | 342/42 |
| 2006/0109169 A1 * | 5/2006 | Winter et al. | 342/195 |

FOREIGN PATENT DOCUMENTS

WO    WO2006/103391 A1 * 10/2006

* cited by examiner

TARGET TRACKING METHOD OF RADAR WITH FREQUENCY MODULATED CONTINUOUS WAVE

BACKGROUND OF THE INVENTION

1. Field of the Invention

The present invention relates to a detected method, and more particularly, to a target tracking method of radar with a frequency modulated continuous wave, which is used for increasing the radar target tracking efficiency.

2. Description of the Prior Art

Today, wireless communication technology is very developed. The radar's applications are very mature technology and particularly apply to a target tracking purpose. In the prior art, the waveform of the detected signal and reflected signal with the equal relative velocity between the radar with frequency modulated continuous wave and target is shown in FIG. 1. The type of the radar with frequency modulated continuous wave utilizes the radar transmitting a transmitted signal St. In a frequency sweep time T, the transmitted signal St is an upsweep frequency signal and the frequency of the transmitted signal St is increased from first frequency F1 to second frequency F2. Then, in next frequency sweep time T, the transmitted signal St is decreased from second frequency F2 to first frequency F1 so that the transmitted signal St can sweep up and sweep down periodically. The transmitted signal St is reflected from the target and then transmits on to the radar to form a reflected signal Sr.

The timing offset of the transmitted signal St and the reflected signal Sr is a delay time td, which is decided to the relative distance between the target and radar. When the radar is basis of the upsweep frequency signal being carried out to sweep, the delay time td causes the beat frequency fb1, the frequency offset of the transmitted signal St and the reflected signal Sr. When the radar is basis of the downsweep frequency signal being carried out to sweep, the delay time td causes the beat frequency fb2, the frequency offset of the transmitted signal St and the reflected signal Sr. If the beat frequency fb1 is equal to the beat frequency fb2 that means the relative velocity of the radar and the target is zero, so the relative frequency shift is not generated between the transmitted signal St and the reflected signal Sr. The distance between the radar and the target is calculated by range frequency fr, (fr=fb1=fb2). If the relative frequency shift is generated between the transmitted signal St and the reflected signal Sr that is a Doppler frequency shift fd. A relative velocity exists between the radar and target that is shown in FIG. 2 and FIG. 3.

In the prior art, the waveform of the transmitting signal and the reflected signal of the target approaching radar by constant speed is shown in FIG. 2. When the target approaches the radar by a constant speed, the Doppler frequency shift fd is generated between the transmitted signal St and the reflected signal Sr that will cause the beat frequency fb1 to reduce and cause the beat frequency fb2 to increase. In the prior art, the waveform of detected signal and reflected signal of the target leaving the radar by constant speed is shown as FIG. 3. When the target leaves the radar by constant speed, the Doppler frequency shift fd is generated between the transmitted signal St and the reflected signal Sr that will cause the beat frequency fb1 to increase and the beat frequency fb2 to reduce. The range frequency fr and the Doppler frequency shift fd are calculated by the radar getting the beat frequency fb1 and the beat frequency fb2. Then, the relative distance R of the target is got by the distance frequency fr and the target speed V is got by the Doppler frequency shift fd. The operation formula is as following description:

$$fb1 = fr - fd \quad (1)$$

$$fb2 = fr + fd \quad (2)$$

$$fr = \frac{fb1 + fb2}{2} \quad (3)$$

$$fd = \frac{fb2 - fb1}{2} \quad (4)$$

$$R = \frac{c \times T \times fr}{2 \times Fs} \quad (5)$$

$$V = \frac{c \times fd}{2f_0} \quad (6)$$

Wherein, c is the speed of light, T is a frequency sweep time, Fs is the bandwidth of sweep frequency and $f_0$ is a frequency center of the transmitting signal.

However, it is complicate to process the reflecting wave of a plurality of the target. The radar in the prior art must completely scan upsweep frequency signal and downsweep frequency signal and then the relative frequency shift is got between the target and the radar. Hence, the relative frequency shift between the target and the radar causes the longer operation time in the prior art. Besides, the scan upsweep frequency signal and the downsweep frequency signal are adopted non-coherent integration process in whole detected area of the radar in the prior art, so the memory of the radar is consumed and the signal process efficiency is reduced.

Accordingly, the invention provides a target tracking method of radar with frequency modulated continuous wave, which detects the whole signals in a part of detected range. The target tracking method of radar with frequency modulated continuous wave only utilizes the upsweep frequency signal or the downsweep frequency signal to calculate the relative distance between the radar and the target and reduce the operation time of the radar. Then, the process efficiency of the radar is increased.

SUMMARY OF THE INVENTION

The primary objective of the present invention provides with a target tracking method of radar with frequency modulated continuous wave, which is basis of the reflected wave corresponding to range gate to get a measure position of the target at a specific time and α-β filter calculating the position and speed at the specific time and the position at the next time to track the target efficiently.

The secondary objective of the present invention provides for a target tracking method of radar with frequency modulated continuous wave, which simplifies a transmitted signal as an upsweep frequency signal or a downsweep frequency signal to detect the reflected wave reflecting from the target that increases the process efficiency of the signal and economizes the system memory.

The present invention relates to a target tracking method of radar with frequency modulated continuous wave, which identifies the target by adopting simplified transmitting signal and compensating Doppler frequency shift, so as to economize the operation time and the memory efficiently. The present invention transmits a simplified transmitted signal to receive the reflected wave of the transmitted signal as a reflected signal and track the target according to the radar receiving the reflected signal. Also, the present invention opens a range window according to the found target and enforces the Non-Coherent Integration (NCI) in the range window. The process logic of the target even economizes the operation time and the memory that compares with the Non-Coherent Integration process of the whole distance in the prior art. We can calculate the range gate error according to the target reflected wave's range gate and estimated range gate and then estimate the next position and next speed of the target at the next time according to the range gate error, so the target is tracked steady.

These and other objectives of the present invention will no doubt become obvious to those of ordinary skill in the prior art after reading the following detailed description of the preferred embodiment that is illustrated in the various figures and drawings.

DETAILED DESCRIPTION OF THE PREFERRED EMBODIMENT

Figure 1:
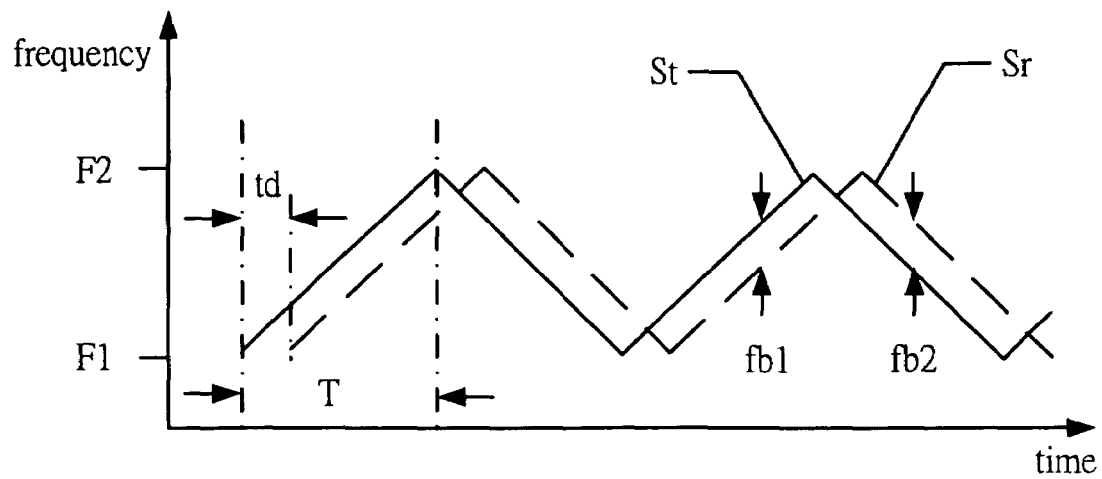
FIG. 1 is a waveform plot of the transmitted signal and the reflected signal of the radar and the target at the same speed of the prior art.
Figure 2:
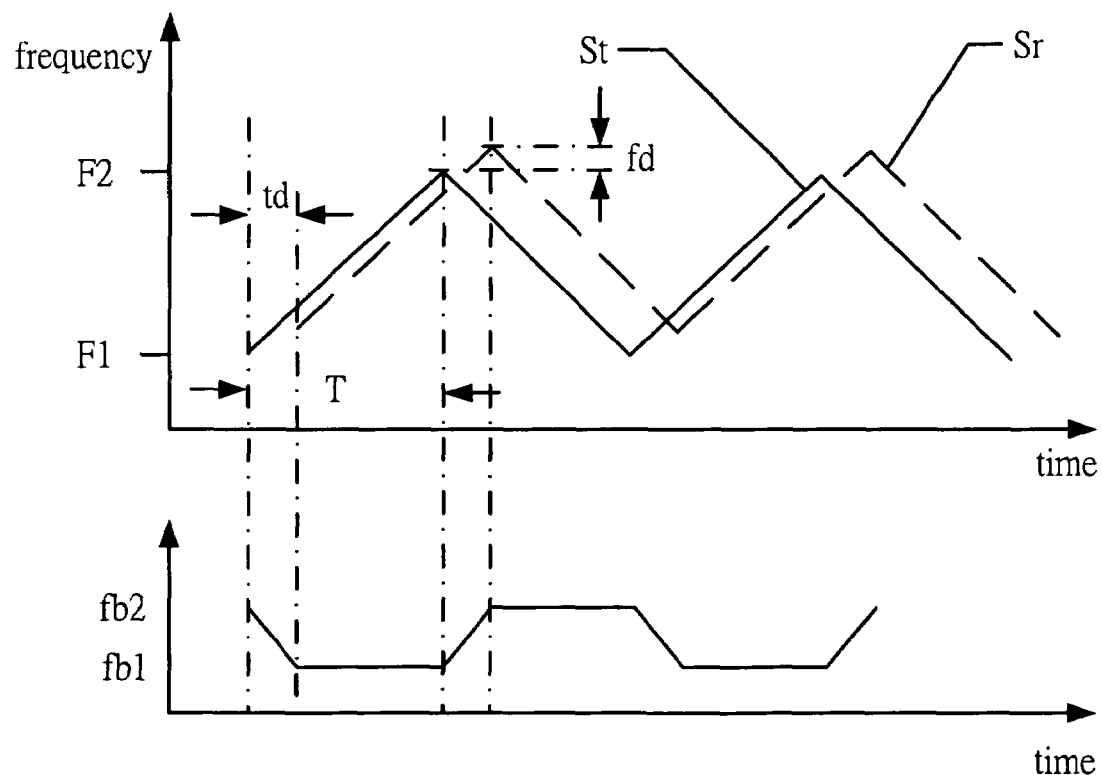
FIG. 2 is a waveform plot of the transmitted signal and the reflected signal of the target approaching to the radar at the constant speed of the prior art.
Figure 3:
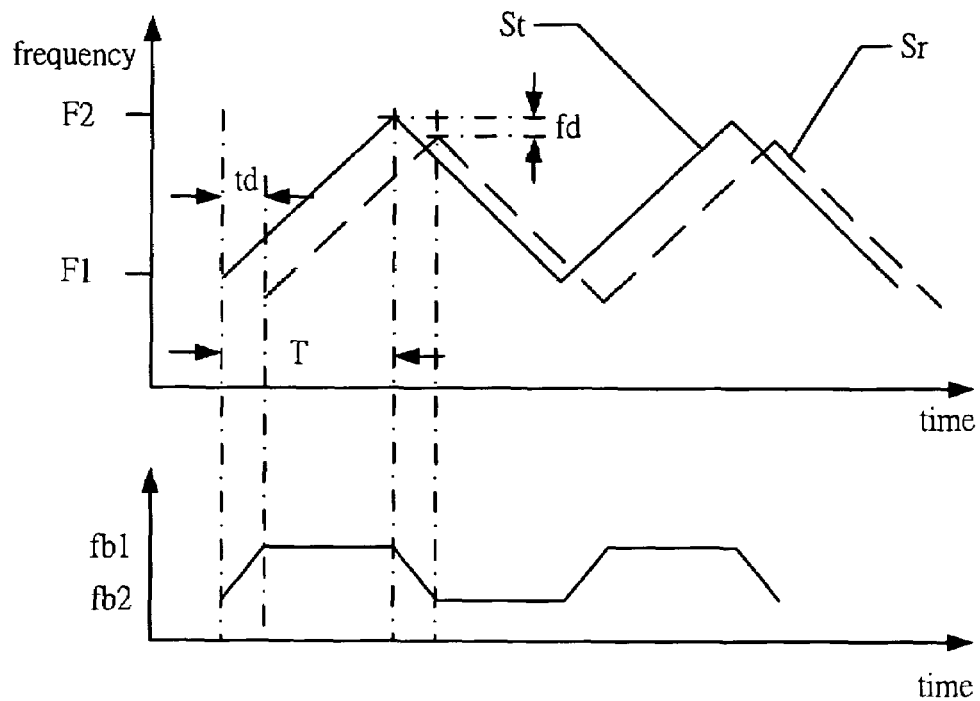
FIG. 3 is a waveform plot of the transmitted signal and the reflected signal of the target leaving the radar at the constant speed of the prior art.
Figure 4:
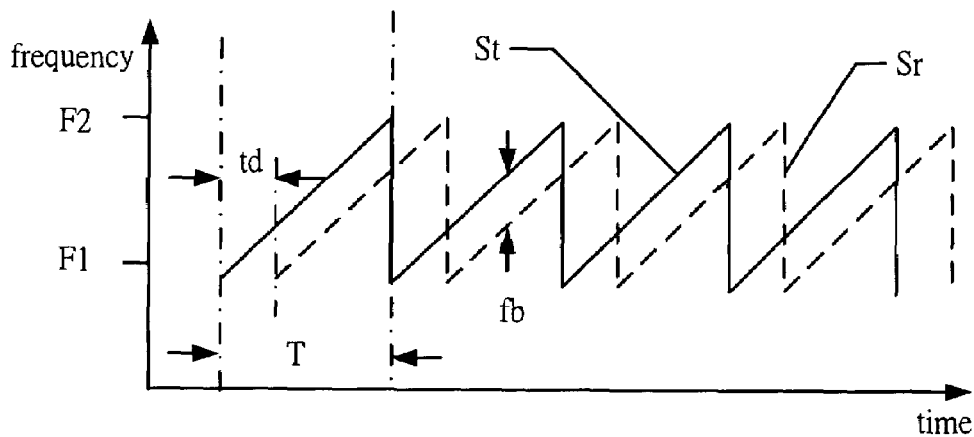
FIG. 4 is a waveform plot of the transmitted signal of the present invention.

The present invention relates to a target tracking method of radar with frequency modulated continuous wave (FMCW), which divides the interval distance between the radar and the target into a plurality of range gates and receives the returned wave reflection signal of the transmitted signal to judge the target in which one range gate. The present invention further gets the relative distance between the target and the radar and the relative speed of the target according to the determining frequency sweep mode. The different frequency sweep mode will induce different sweep slope. Besides, the present invention utilizes the transmitted signal of the sawtooth waveform to detect. Compared with the traditional FMCW radar, the present invention reduces the complexity of the computing loading and operation logic. Hence, the present invention economizes the system resources and increases the efficiency of the radar system. The sawtooth waveform of the transmitted signal is shown in FIG. 4.

Figure 5:
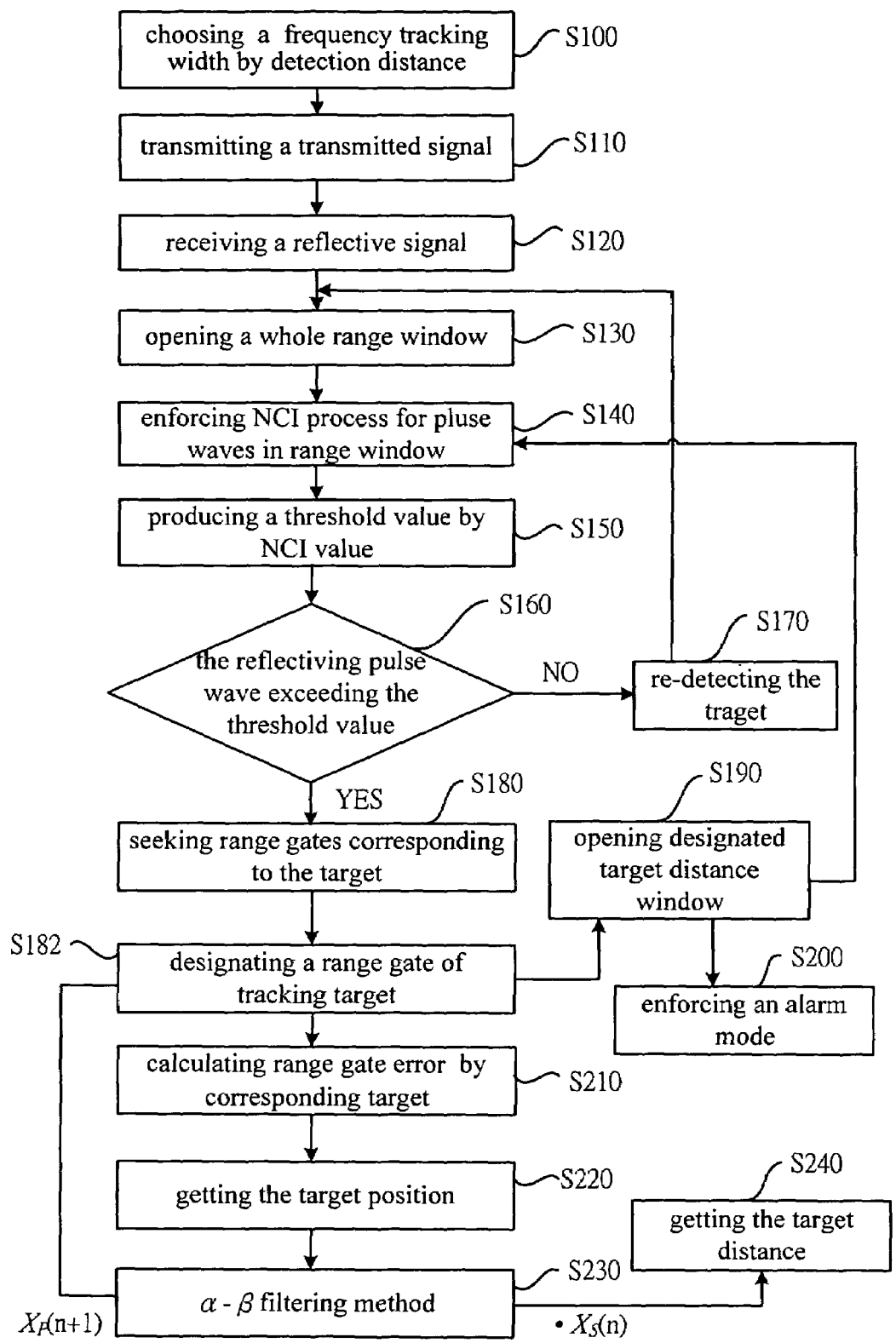
FIG. 5 is a flow chart of target tracking of one preferred embodiment of the present invention.

Please see the FIG. 5, which is a flow chart of target tracking of one preferred embodiment of the present invention. The target tracking method of FMCW radar provides the frequency modulated radar to detect the target by at least one range window and simplifies the process of transmitting signal and increases the system efficiency. The first step of the target tracking method of the FMCW radar is S100. A frequency sweep bandwidth is chosen according to the detected distance of the target detected by the radar system. The different detected distances correspond to the different frequency sweep modes, which correspond to different frequency sweep deviations. For example, the detected distance is divided into n sections to correspond to n kinds of the frequency sweep bandwidth so the n sections correspond to n frequency sweep modes and n kinds of the detected resolutions. The consumed time of sweeping frequency for different tracking mode is the same and the initial frequency of each mode is the same but the frequency slew rate is different according to the different sections.

Thereby, when the detected distance is nearby the radar, the frequency sweep bandwidth is larger. When the detected distance is far away the radar, the frequency sweep bandwidth is smaller. It is a trade off between the fine resolution and the sweep bandwidth. We can utilize the different beat frequencies of the transmitted waves and reflected waves to choose the different tracking modes. Furthermore, when the detected distance is unknown, the largest sweep slope is chosen to initially estimate the distance of the target and then a smaller and proper bandwidth is re-chosen for the transmitted signal.

Continuously, follow the step S110 of transmitting a transmitted signal by choosing frequency sweep mode. Then, the step S120 is enforced and the reflected return wave of the transmitted signal is received. The transmitted signal is a frequency modulated continuous wave and the reflected signal includes a plurality of reflected waves. Then, the process of judgment target is enforced and the process of judgment target includes the step S130, S140, S150, S160, S170, S180 and S182. Whole range window is opened to detect the reflected waves according to the step S130. The non-coherent integration (NCI) is enforced in the whole range window and all pulse waves are treated by non-coherent integration in the whole range window according to the step S140. Then, the step S150 is enforced. A threshold value is calculated according to the value of the NCI. The threshold value is so-called the constant false-alarm rate (CFAR). Please follow the step S160. All reflected waves of the whole range window are compared with the threshold value of the step S150. When the reflected wave exceeds the threshold value, the step 180 will be enforced. If no one reflected wave exceeds the threshold value, the step S170 will be enforced. Please follow the step S170. Because one reflected wave exceeds the threshold value in step S160 that means the target not be present in the whole range window. Hence, the step S140 is enforced again to detect the target.

Figure 6:
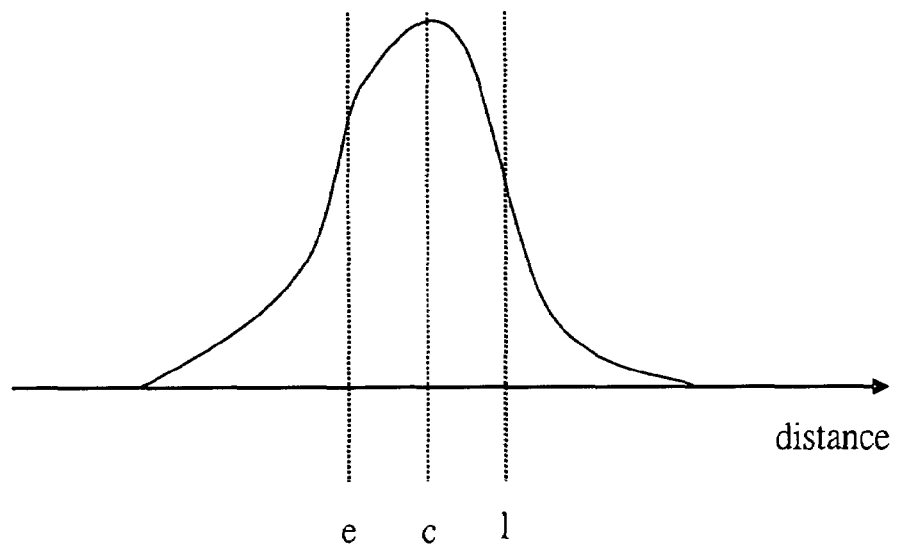
FIG. 6 is an illustration of range gate error of one preferred embodiment of the present invention.
Figure 7:
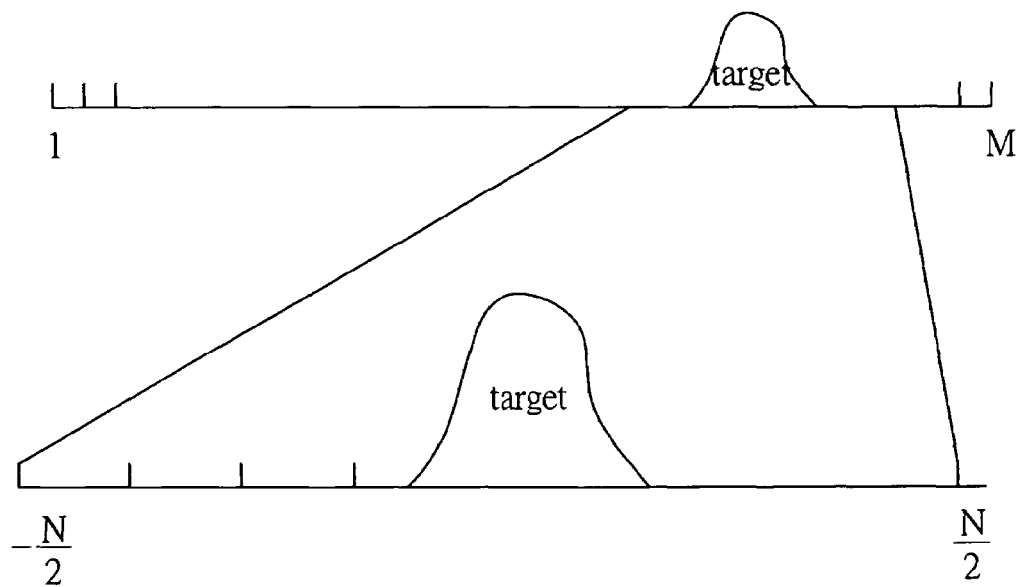
FIG. 7 is an illustration of opening range window with the assigned target of one preferred embodiment of the present invention.

Continuously, the step S180 is followed. The range gates corresponding to the target are sought according to the reflected waves of the targets. The range gate corresponding to the target is designated as show in the step S182. Then, the step S190 is followed. The range window of the target is opened according to the range gate of designating target place and the following process of the target is basis of the signal of designated target's range window enforced by NCI process in step S190. Because the length of the designated target's range window is far less than the whole range window (as show in FIG. 7), the radar of the present invention don't need using the whole range window to fine tune the range gate of the designated target. Hence, the radar system of the present invention utilizes less operation time and memory for signal processing of the reflected wave of target tracking. As show in the step S200, the relative situation between the assigned target and other targets in the range window are memorized and then the situation alarm mode (SAM) is enforced. This mode can provide the latest situation near by the designated target and can supply the radar system to judge their tracking algorithms. The step S210 is followed continuously. As shown in FIG. 6, calculating the range gate error according to the distance between the early gate (e) of the reflected wave and later gate (1) of the reflected wave. The range gate error can be utilized to enforce the step S220, which is the basis of different tracking logics and physical environments to choose the proper range gate for tracking. The mathematic formula is as following:

$$\hat{R} = R_c + K_1 \frac{A_e - A_l}{A_e + A_c + A_l} \qquad (7)$$

$\hat{R}$ is a measured range gate of the target, which is the same as y(n) of the equation (8). $R_c$ is a center range gate of the tracking at present. $A_e$ is an reflected wave's amplitude of the front range gate. $A_c$ is an reflected wave's amplitude of the target's center range gate. $A_l$ is an reflected wave's amplitude of the rear range gate. $K_1$ is a adjusted parameter which depends on the distance of the every range gate in chief.

Continuously, the step S230 is as following. The estimated method is utilized and the estimated value of the position and the relative speed at next time are evaluated. The estimated method is an α-β filtering method, whose operation formula is as following:

$$x_s(n) = x_P(n) + \alpha(y(n) - x_P(n)) \qquad (8)$$

$$\dot{X}_s(n) = \dot{X}_s(n-1) + \beta(y(n) - x_p(n))/T \qquad (9)$$

where T is the sample period and the index n means the (n) th observation sample and the subscripts "p" and "s" are used to indicate, respectively, the predicated and smoothed values. The predicted position is given by $$X_P(n+1) = X_s(n) + T\dot{X}_s(n). \qquad (10)$$

$\dot{X}_s(n)$ is an estimated relative speed of the target at this time and it is direct proportion to Doppler frequency shift. Hence, the Doppler frequency shift between the reflected wave and transmitted wave are got by $\dot{X}_s(n)$ of the step S230 and the center frequency of the transmitted signal $f_0$ and the light speed C. The Doppler frequency shift is as shown in equation (12). Finally, the step S240 is as following description. The distance R between the target and radar is got by the beat frequency ($f_b$) between the transmitted wave and reflected wave of the target, the frequency sweep deviation $F_s$ and the sweep time T. In other words, different tracking mode will induce different range resolution. The distance R and the relative Doppler frequency are as following:

$$R = \frac{CT}{2F_s}(f_b \pm f_d) \qquad (11)$$

$$f_d = \frac{2V}{C} f_0 \qquad (12)$$

When the sawtooth waveform of the transmitted signal is a signal wave shape of the upsweep mode, ⌈$f_b \pm f_d$⌋ is changed to ⌈$f_b + f_d$⌋ in the equation (11). When the sawtooth waveform of the transmitted signal is a signal wave shape of the downsweep mode, ⌈$f_b \pm f_d$⌋ is changed to ⌈$f_b - f_d$⌋ in the equation (11).

Besides, the present invention's method is used for any the radar with frequency modulated continuous wave and used for measuring distance, measuring speed and measuring position. In military affairs, the present invention can be applied to missile detonator, seeker, digital altimeter, guide control radar and measured speed instrument, synthetic aperture radar (SAR), surveillance radar, altimeter of civil guide aircraft radar, tank liquid level radar, ball speed detected, traffic flow detected and car crash-proof radar, etc. The present invention is widely applied to many areas.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A target tracking method for a radar transmitting a frequency modulated continuous wave comprising the steps of:
   transmitting a transmitted signal which has a frequency modulated continuous wave to detect a target;
   receiving a reflected signal which has a plurality of reflected waves, the reflected waves being return waves of the transmitted signal;
   detecting the reflected waves and getting the reflected waves corresponding to the target;
   seeking a plurality of range gates corresponding to the reflected wave of the target;
   obtaining a range gate error by calculating the range gates based on the reflected wave of the target;
   obtaining a measured position of the target according to the range gate error;
   estimating a position and a speed of the target at a next time increment according to the position of the target at a current time;
   processing the speed of the target and a center frequency of the transmitted signal to get a Doppler frequency shift; and
   calculating a relative distance between the radar and the target using the Doppler frequency shift, a frequency difference of the frequency modulated continuous wave and the reflected wave corresponding to the target, a frequency sweep time of the frequency modulated continuous wave and a bandwidth of the frequency modulated continuous wave.

2. The method according to claim 1, wherein the step of transmitting a signal further comprises a step of:
   choosing the bandwidth of the frequency modulated continuous wave according to a detected distance.

3. The method according to claim 2, wherein when the detected distance is unknown, the step of choosing the bandwidth of the frequency modulated continuous wave includes choosing a largest sweep slope to initially estimate the distance of the target and then re-choose a bandwidth in correspondence with the estimated distance.

4. The method according to claim 1, wherein different bandwidths correspond to different detected ranges.

5. The method according to claim 1, wherein the step of detecting the reflected waves further comprises the steps of:
   opening a whole range window and determining a scope of the reflected signal of the target;
   enforcing a non-coherent integration process for the reflected waves of the whole range window;
   producing a threshold value according to the non-coherent integration process; and
   getting the reflected waves corresponding to the target using the threshold value.

6. The method according to claim 5, wherein the step of detecting the reflected waves using the threshold value includes judging the reflected waves obtained using the threshold value and reflected waves larger than the threshold value.

7. The method according to claim 5, wherein the threshold value is a constant false-alarm rate.

8. The method according to claim 5, further comprises, subsequent to the step of seeking a plurality of range gates corresponding to the reflected wave of the target, the step of:

opening a designated target range window by the range gates, the detected distance of the designated target range window being less than the whole range window for non-coherent integration process.

9. The method according to claim 1, wherein the estimating method is an α-β filtering method.

10. The method according to claim 1, wherein the range gate error, which is obtained by a relationship between an early gate and a later gate of the reflected wave of the target is used to derive a range gate deviation.

11. The method according to claim 1, wherein the transmitted signal is a sawtooth wave.

12. The method according to claim 11, wherein the transmitted signal is an upsweep frequency signal or a downsweep frequency signal.

13. The method according to claim 1, further comprises, preceding the step of detecting the reflected waves, the step of:

transforming the reflected waves to frequency domain data.

14. The method according to claim 13, wherein the step of transforming the reflected waves to frequency domain data utilizes a fast fourier transform to transform the reflected waves.

15. The method according to claim 1, wherein the step of seeking a plurality of range gates further comprises the steps of:

seeking the range gates corresponding to the target; and tracking designated range gates corresponding to the target.

* * * * *